US 6,536,286 B1

(12) United States Patent
Moyer et al.

(10) Patent No.: US 6,536,286 B1
(45) Date of Patent: Mar. 25, 2003

(54) PRESSURE SENSOR CONNECTOR

(75) Inventors: James I. Moyer, Kokomo, IN (US); Joseph M. Ratell, Indianapolis, IN (US); Daniel A. Lawlyes, Kokomo, IN (US); Paul J. Pitzer, Kokomo, IN (US); Perry L. Martinson, Kokomo, IN (US); Steven T. Reyburn, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/702,920

(22) Filed: Oct. 30, 2000

(51) Int. Cl.⁷ .............................................. G01L 13/02
(52) U.S. Cl. ....................................................... 73/716
(58) Field of Search .......................... 73/715, 716, 717, 73/718, 754, 756, 723, 724, 115; 361/283.1, 283.4, 776

(56) References Cited

U.S. PATENT DOCUMENTS

| 4,449,113 A | * | 5/1984 | Gould et al. ................... 338/39 |
| 4,875,135 A | * | 10/1989 | Bishop et al. ................. 361/283 |
| 6,186,009 B1 | * | 2/2001 | Miyano et al. ................. 73/756 |
| 6,227,055 B1 | * | 5/2001 | Pitzer ............................ 73/715 |
| 6,298,730 B1 | * | 10/2001 | Yamagishi et al. ............ 73/723 |

* cited by examiner

Primary Examiner—Hezron Williams
Assistant Examiner—Marissa Ferguson
(74) Attorney, Agent, or Firm—Jimmy L. Funke

(57) ABSTRACT

A pressure sensor connector (10) for use with a pressure sensor element (12) that includes a plurality of pressure sensor terminals (13). The pressure sensor connector (10) includes a housing (18), a plurality of connector terminals (20) and a flexible circuit (22). A plurality of electrical pathways (24), formed on the flexible circuit (22), connect each of the plurality of connector terminals (20) to a corresponding pressure sensor terminal (13).

19 Claims, 2 Drawing Sheets

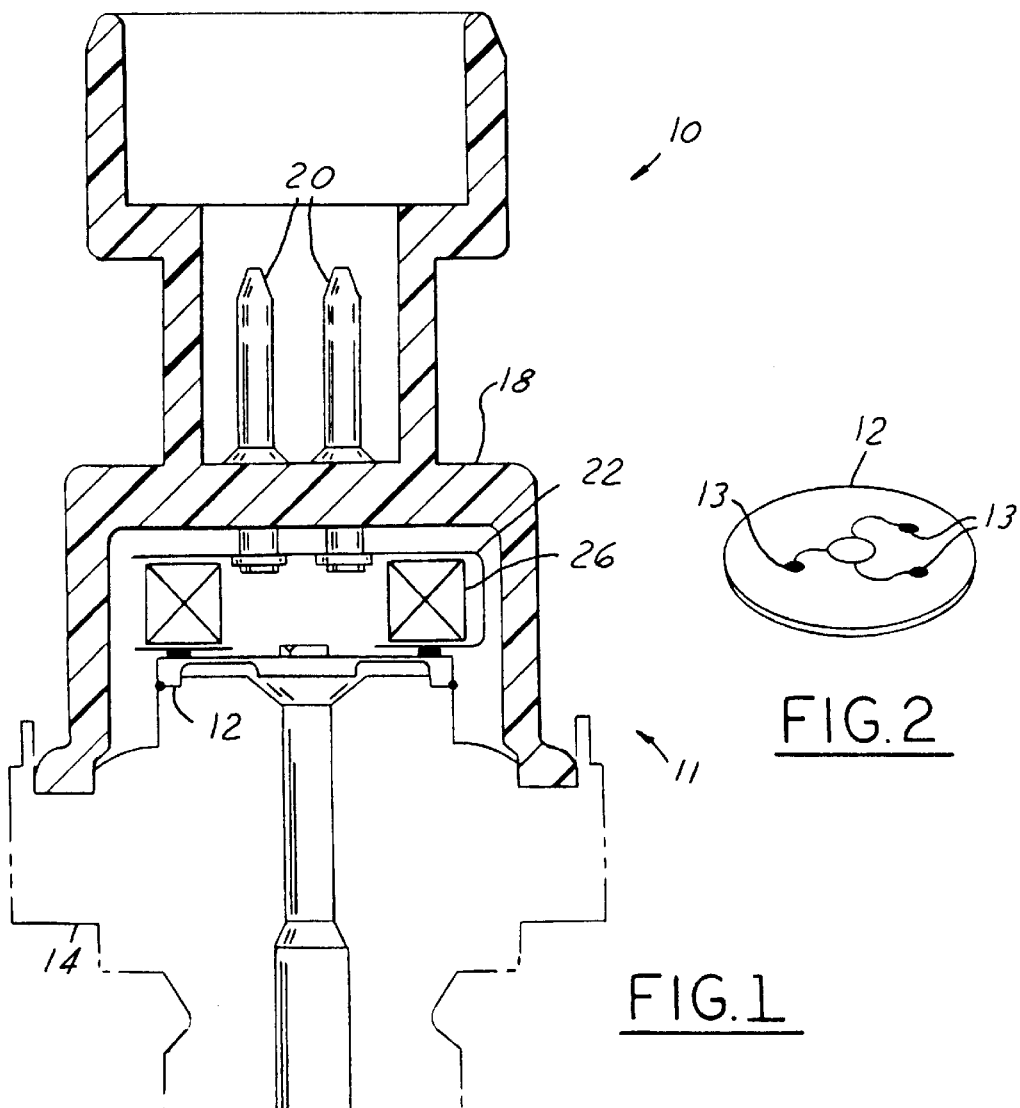
FIG.1
FIG.2
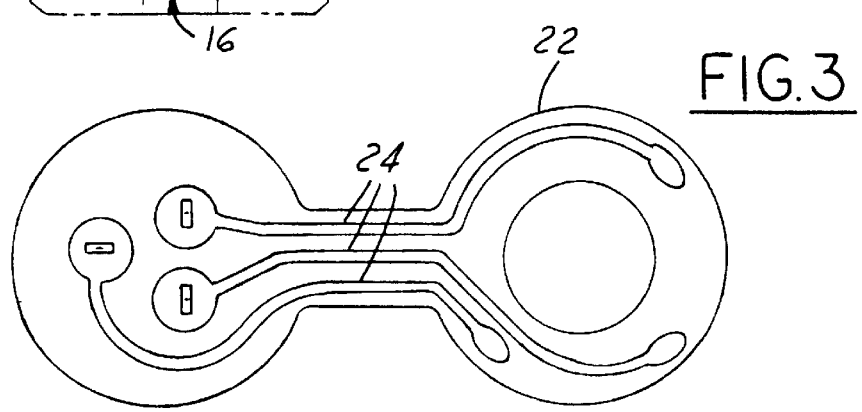
FIG.3

PRESSURE SENSOR CONNECTOR

TECHNICAL FIELD

The present invention relates generally to a pressure sensor connector and more specifically to a pressure sensor connector with simplified assembly and reduced cost.

BACKGROUND OF THE INVENTION

Pressure sensors are well-known devices commonly utilized to monitor fluid pressure values or changes in such values. Often these sensors are fitted with components to facilitate installation and removal from larger components. Common pressure connectors take the form of a cap that attaches to the pressure sensor element and includes multiple terminals to allow the pressure sensor element to be easily connected to a wire harness or directly to other components.

These common connectors often must have multiple electrical pathways formed within the connector housing in order to accommodate the multiple terminals commonly required by pressure sensor assemblies. The necessity of electrical pathways within the connector housing is known to increase the cost and complexity of the connector. This is highly undesirable.

In addition to increasing the cost and complexity of connector manufacturing, present designs additionally can increase the cost and complexity of assembling the connector to the pressure sensor element (or cell). Commonly, wire bonding techniques are utilized to create the electrical pathway between the pressure sensor terminals and the connector. Although wire bonding is highly useful in connecting the connector to the pressure sensor element due to its low profile, it has the undesirable effect of increasing the cost and complexity of assembly. In addition, it is known wire bonds can become fragile as the distance the bonds span increases. This is also undesirable since it has the potential to negatively affect the durability of the pressure sensor assembly. Finally, the diminutive size of wire bonds combined with their sensitivity to length can require a precise alignment of the pressure sensor element within the connector to insure proper application. Again, these characteristics can serve to increase the cost and complexity of pressure sensor component assembly.

It would, therefore, be highly desirable to have a pressure sensor connector with reduced manufacturing costs and complexity. In addition, it would be highly desirable to have a pressure sensor connector that reduces the cost and complexity of attaching the connector to the pressure sensor element associated with many known designs.

SUMMARY OF THE INVENTION

It is therefore an object of the present invention to provide a pressure sensor connector that reduces the cost and complexity of manufacturing. It is a further object of the present invention to provide a pressure sensor connector that reduces the cost and complexity of attaching the connector to the pressure sensor element.

In accordance with the objects of this invention, a pressure sensor connector is provided. The pressure sensor connector is intended for use with a pressure sensor element that includes a plurality of pressure sensor terminals. The pressure sensor connector includes a housing. Formed within the housing are a plurality of connector terminals. The pressure sensor connector further includes a flexible circuit. A plurality of electrical pathways are formed on the flexible circuit. Each of the plurality of electrical pathways connects one of the plurality of connector terminals to a corresponding pressure sensor terminal.

Other objects and features of the present invention will become apparent when viewed in light of the detailed description of the preferred embodiment taken in conjunction with the attached drawings and appended claims.

BRIEF DESCRIPTION OF DRAWINGS

FIG. 1 is a cross-section of an embodiment of a pressure sensor assembly, including the pressure sensor connector in accordance with the present invention;

FIG. 2 is an illustration of a pressure sensor element (or cell) for use in the pressure sensor connector illustrated in FIG. 1;

FIG. 3 is an illustration of a flexible circuit for use in the pressure sensor connector illustrated in FIG. 1.

DESCRIPTION OF THE PREFERRED EMBODIMENT(s)

Figure 4:
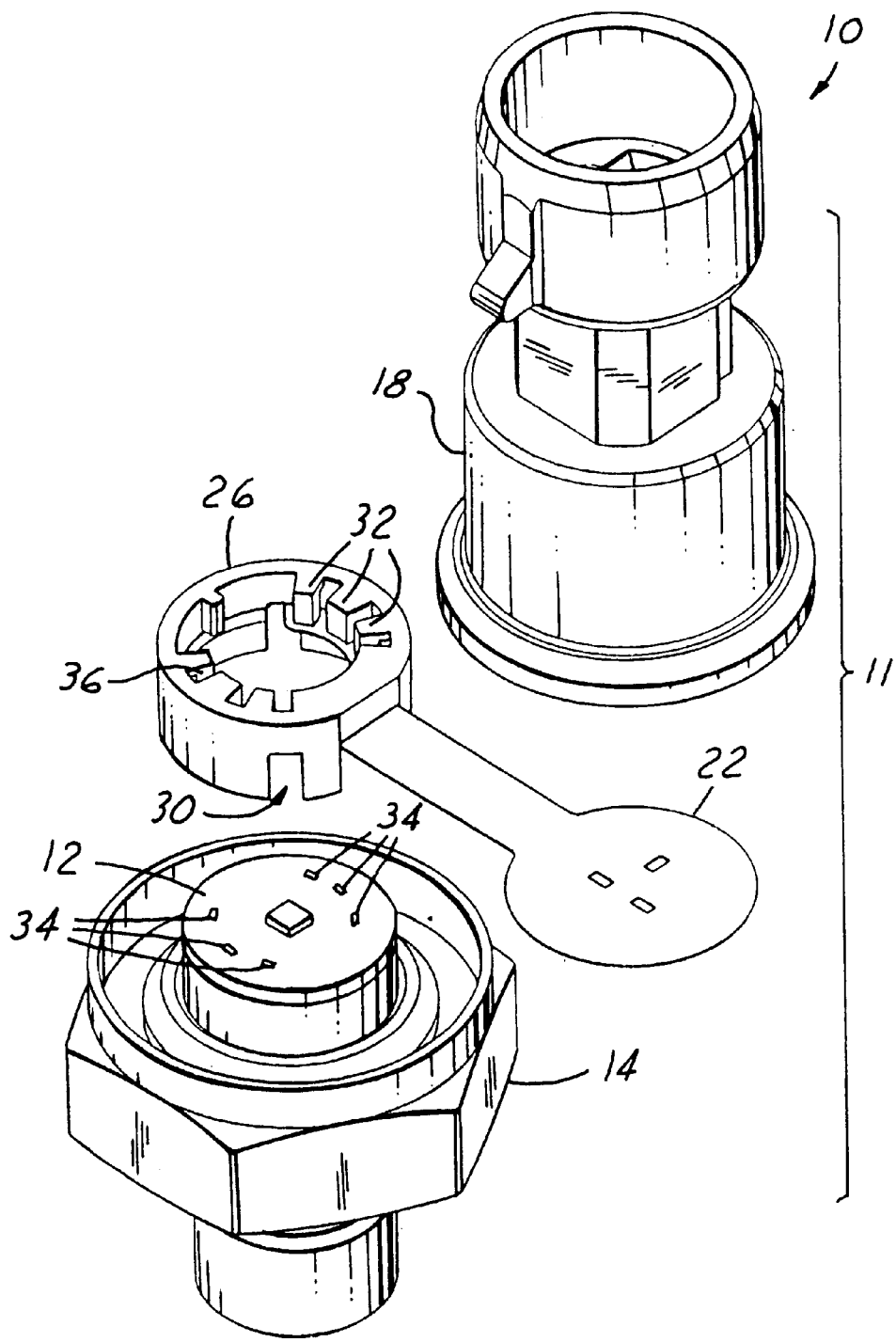
FIG. 4 is an illustration of an embodiment of a pressure sensor assembly, including the pressure sensor connector in accordance with the present invention.

Referring now to FIG. 1, which is a cross-section of an embodiment of a pressure sensor assembly 11, including pressure sensor connector 10 in accordance with the present invention. The disclosed pressure sensor connector 10 is preferably for use in harsh environments, where it will likely be exposed to high temperatures, vibration, and corrosive fluids, such as the environment under the hood of motor vehicles. Such applications would include oil, brake fluid, refrigerant, coolant, transmission fluid, and air pressure sensors. However, the disclosed pressure sensor connector 10 may be used in a variety of applications, including non-automotive applications.

The pressure sensor connector 10 is intended for use with a pressure sensor element 12 (see FIG. 2). Pressure sensors are well known in the automotive industry as well as other industries. Commonly pressure sensors are devices that convert pressure values or changes in pressure into electrical signals, and contain a plurality of pressure sensor terminals 13. Often these pressure sensor elements 12 are used in connection with a base 14 containing a port 16 through which the pressure of a working fluid is monitored by the pressure sensor element 12. Although the pressure sensor element 12 is illustrated in connection with a base 14 and a port 16, it should be understood that a wide variety of methods are known to place a pressure sensor element 12 in connection with a pressure source and are contemplated by this invention. It is common in many situations to utilize a pressure sensor connector to allow electrical connections to the pressure sensor terminals to be easily made.

The pressure sensor connector 10 includes a housing 18. A plurality of connector terminals 20 are positioned within the housing 18. The plurality of connector terminals 20 allow the pressure sensor connector 10 to be easily connected and disconnected from other components. This is commonly accomplished through the use of a wire harness, although a variety of known methods are contemplated. Although the housing 18 and the plurality of connector terminals 20 are depicted in a standard male configuration, it should be understood that a wide variety of configurations are contemplated, including female configurations.

One of the purposes of the pressure sensor connector 10 is to provide a convenient electrical conduit to the plurality of pressure sensor terminals 13 through the use of the plurality of connector terminals 20. In the past, the electrical conduit could require electrical conduits formed within the housing 18 and wire bonds to connect the pressure sensor terminals 13 to the plurality of connector terminals 20. The present invention eliminates this often costly and complex arrangement. The present invention uses a flexible circuit 22 to eliminate the need for complex electrical conduits formed within the housing and the use of wire bonding.

Referring now to FIG. 3, which is a illustration of the flexible circuit 22. Flexible circuits are well known and can be produced in a wide variety of shapes and sizes. Although a single embodiment has been illustrated, it should be understood that a wide variety of other forms of the flexible circuit 22 are contemplated. The flexible circuit 22 includes a plurality of electrical pathways 24. Each of the plurality of electrical pathways 24 is used to electrically connect one of the plurality of connector terminals 20 to a corresponding pressure sensor terminal 13. The flexible circuit 22 preferably forms a u-shaped bend 15 when positioned within the housing 18. The electrical pathways 24 can be connected to the plurality of connector terminals 20 and the plurality of pressure sensor terminals 13 through a variety of known methods. In one embodiment, the connection is made using electrically conductive adhesive. In another embodiment, the connection is made through the use of solder. In still another embodiment, the electrical pathways 24 are connected to the plurality of connector terminals 20 through the use of solder and are connected to the plurality of pressure sensor terminals 13 through the use of electrically conductive adhesive. Although several connection methods have been described, it should be understood that a wide variety of connection methods are contemplated, such as welding, perhaps by laser, brazing, or simple interference fit pressure contact to name just a few.

The pressure sensor connector 10 can also include a spacer element 26 (best seen in FIG. 1) positioned within the unshaped bend 15 of the flexible circuit 22. Although the spacer element 26 is not necessary to utilize the advantages of the flexible circuit 22, it can be highly desirable. The spacer element 26 can be used to insure proper contact is maintained between the flexible circuit 22 and the pressure sensor element 12 during the curing of an electrically conductive adhesive if it is used. In addition, the spacer element 26 can assist in reducing movement of the flexible circuit 22 during operation of the pressure sensor element 12 and can therefore be useful in improving the durability of the pressure sensor connector 10. The spacer element 26 can be formed out of a variety of well known materials. In one embodiment, the spacer element 26 is a simple foam ring. In another embodiment, the spacer element 26 can be formed from an elastomer spring material. Although several embodiments of the spacer element 26 have been described, it should be understood that a wide variety of materials and forms for the spacer element 26 are contemplated.

In still another embodiment, as illustrated in FIG. 4, the spacer element 26 can be formed through the use of precision injection molded plastic. The spacer element 26 is formed to retain the flexible circuit 22. This may be accomplished through a variety of known methods. The flexible circuit 22 may be retained through the use of insert molding, by interference fit, by snap fit, by adhesive bonding, by ultrasonic bonding, or a variety of other known methods. The spacer element 26 may, in fact, be initially formed in two pieces to facilitate the insertion of the flexible circuit or may be formed as a single element. The spacer element 26 in this embodiment can be formed to allow snap or interference fitting with the pressure sensor element 12 or base 14 to allow quick and reliable installation. The spacer element 26 in this embodiment, may further be formed with shape elements 30 designed to match the shape of the pressure sensor element 12 to insure proper alignment with the pressure sensor element 12 and/or base 14. Finally, the spacer element 26, in this embodiment may be formed with spring elements 32 to insure that after attachment to the pressure sensor element 12 the flexible circuit 22 is held in contact with the pressure sensor element 12. The illustrated spring elements 32 are simple cantilever protrusions that deform when attached to the pressure sensor element 12 and exert downward force. Although this well known method of forming spring elements 32 has been described, it should be understood that a wide variety of methods of creating such spring elements are known and contemplated by this invention.

As was discussed earlier, the electrical pathways 24 on the flexible circuit 22 can be connected to the pressure sensor terminals 13 through the use of laser welding. In one embodiment, laser weld pads 34 can be utilized to facilitate the connection of the electrical pathways 24 to the pressure sensor terminals 13. Laser weld pads 34 are well known in the automotive and electrical industry. In one embodiment, the laser weld pads 34 are mechanically attached to the pressure sensor element 12 through the use of solder, although a variety of methods may be utilized. The laser weld pads 34 provide an electrical connection to the pressure sensor terminals 13. When the flexible circuit 22 is positioned on top of the pressure sensor element 12, a laser can be used to weld the electrical pathways 24 to the laser weld pads 34 and thereby provide a secure electrical connection to the pressure sensor terminals 13. The laser weld can be accomplished in combination with the injection molded plastic spacer element 26 by firing the laser through gaps 36 in the spacer element 26 after preliminary assembly.

This method of interconnection provides several advantages. One known advantage over the use of electrically conductive adhesive, is that laser welding eliminates the problem of smeared adhesive. Rotation of the flexible circuit 22, when used with electrical adhesive, prior to the curing of the adhesive can potentially cause misregistration of the pressure sensor circuit. In addition, the use of laser welding can reduce concerns caused by contamination. Contamination of the pressure sensor element 12 or the flexible circuit 22 can preclude a successful interconnection when soldering or electrical adhesive is used. Laser welding can burn through many common contaminants and thereby eliminate many contamination concerns.

The present invention is highly useful in reducing the cost and complexity of many current designs. The use of the flexible circuit 22 facilitates the use of electrical connection techniques such as electrically conductive adhesive, solder, and other techniques that are less complex and have reduced costs when compared to wire bonding. The use of laser welding can reduce contamination concerns and improve interconnect reliability. In addition, the flexible circuit 22 eliminates the need for complex and costly electrical conduits to be formed within the housing of the pressure sensor connector 10. Finally, prior wire bonding systems often required precise alignment of the pressure sensor element 12 within the pressure sensor connector 10 to insure that connection to the pressure sensor terminals 13 was feasible. The present invention reduces the need for precise alignment by allowing the flexible circuit 22 to be extended and attached to the pressure sensor element 12 and base 14 prior to the pressure sensor element 12 and base 14 assembly being inserted into the pressure sensor connector 10. Although several advantages of the present invention have been described, a wide variety of advantages and uses of the present invention are contemplated.

While particular embodiments of the invention have been shown and described, numerous variations and alternate embodiments will occur to those skilled in the art. Accordingly, it is intended that the invention be limited only in terms of the appended claims.

What is claimed is:

1. A pressure sensor connector for use with a pressure sensor element including a plurality of pressure sensor terminals comprising:
   a housing;
   a plurality of connector terminals formed within said housing;
   a flexible circuit forming a u-shaped bend within said housing, said flexible circuit including a plurality of electrical pathways formed on said flexible circuit, each of said plurality of electrical pathways connecting one of said plurality of connector terminals to a corresponding pressure sensor terminal; and
   a spacer element positioned within said u-shaped bend, said spacer element minimizing movement of said flexible circuit after assembly.

2. A pressure sensor connector as described in claim 1 wherein said spacer element is an elastomer spring element.

3. A pressure sensor connector as described in claim 1 wherein said spacer element is a foam ring.

4. A pressure sensor connector as described in claim 1 further comprising a plurality of laser weld pads attached to the plurality of pressure sensor terminals, wherein said flexible circuit is attached to said laser weld pads by laser welding.

5. A pressure sensor connector for use with a pressure sensor element including a plurality of pressure sensor terminals comprising:
   a housing;
   a plurality of connector terminals formed within said housing;
   a flexible circuit forming a u-shaped bend within said housing, said flexible circuit including a plurality of electrical pathways formed on said flexible circuit, each of said plurality of electrical pathways connecting one of said plurality of connector terminals to a corresponding pressure sensor terminal;
   a spacer element positioned within said u-shaped bend, said spacer element retaining one surface of said flexible circuit, said spacer element attaching to the pressure sensor element and holding said flexible circuit against the pressure sensor element.

6. A pressure sensor connector as described in claim 5 wherein said flexible circuit is attached to said plurality of connector terminals through the use of solder.

7. A pressure sensor connector as described in claim 5 wherein said flexible circuit is connected to the pressure sensor terminals through the use of an electrically conductive adhesive.

8. A pressure sensor connector as described in claim 5 wherein said flexible circuit is connected to the pressure sensor terminals by a method chosen from the group of soldering, welding, laser welding, brazing and interference fit pressure contact.

9. A pressure sensor connector as described in claim 5 wherein said spacer element is constructed of injection molded plastic.

10. A pressure sensor connector as described in claim 5 wherein said spacer element is formed with shape elements to insure proper alignment with the pressure sensor element.

11. A pressure sensor connector as described in claim 5 wherein said spacer element includes spring elements, said spring elements holding said flexible circuit against the pressure sensor element after installation.

12. A pressure sensor connector as described in claim 11, wherein said spring elements are cantilever protrusions.

13. A pressure sensor connector as described in claim 5 further comprising a plurality of laser weld pads attached to the plurality of pressure sensor terminals, wherein said flexible circuit is attached to said laser weld pads by laser welding.

14. A method of attaching a pressure sensor connector to a pressure sensor element, comprising the steps of:
   inserting a spacer element into the housing, said spacer element minimizing movement of said flexible circuit after assembly;
   attaching a pressure sensor connector, including a housing and a plurality of connector terminals, to a pressure sensor element, including a plurality of pressure sensor terminals, comprising the steps of:
   attaching a first end of a flexible circuit to the plurality of connector terminals;
   attaching a second end of said flexible circuit to the plurality of pressure sensor terminals, said flexible circuit forming a u-shaped bend within the housing and creating electrical pathways between each of the plurality of connector terminals and a corresponding pressure sensor terminal; and
   attaching a pressure sensor connector to a pressure sensor element, further comprising the step of:
   inserting the pressure sensor element into the unshaped bend within the housing.

15. A method of attaching a pressure sensor connector to a pressure sensor element as described in claim 14, wherein said attaching a first end of a flexible circuit to the plurality of connector terminals is accomplished through the use of solder.

16. A method of attaching a pressure sensor connector to a pressure sensor element as described in claim 14, wherein said attaching a second end of said flexible circuit to the plurality of pressure sensor terminals is accomplished through the use of electrically conductive adhesive.

17. A method of attaching a pressure sensor connector to a pressure sensor element as described in claim 14, wherein said attaching a second end of said flexible circuit to the plurality of pressure sensor terminals is accomplished by a method chosen from the group of soldering, welding, laser welding, brazing and interference fit pressure contact.

18. A method of attaching a pressure sensor connector to a pressure sensor element as described in claim 14, wherein said attaching the first end of a flexible circuit to the plurality of connector terminals is accomplished through the use of electrically conductive adhesive.

19. A method of attaching a pressure sensor connector to a pressure sensor element as described in claim 14, wherein said attaching the first end of a flexible circuit to the plurality of connector terminals is accomplished by a method chosen from the group of welding, laser welding, brazing and interference fit pressure contact.

* * * * *